US011210636B1

(12) United States Patent
Hughes et al.

(10) Patent No.: US 11,210,636 B1
(45) Date of Patent: Dec. 28, 2021

(54) SYSTEMS AND METHODS FOR GENERATING PROPOSALS

(71) Applicant: Enfuego Technologies, LLC, Scottsdale, AZ (US)

(72) Inventors: Paul Hughes, Scottsdale, AZ (US); Abhishek Omprakash Singh, San Francisco, CA (US)

(73) Assignee: Enfuego Technologies, LLC, Scottsdale, AZ (US)

( * ) Notice: Subject to any disclaimer, the term of this patent is extended or adjusted under 35 U.S.C. 154(b) by 113 days.

(21) Appl. No.: 15/676,967

(22) Filed: Aug. 14, 2017

(51) Int. Cl.
*G06Q 10/10* (2012.01)
*G06N 5/02* (2006.01)
*G06F 40/30* (2020.01)

(52) U.S. Cl.
CPC ......... *G06Q 10/1053* (2013.01); *G06F 40/30* (2020.01); *G06N 5/022* (2013.01)

(58) Field of Classification Search
CPC ....... G06Q 10/1053; G06Q 10/063112; G06Q 10/105; G06N 5/022
See application file for complete search history.

(56) References Cited

U.S. PATENT DOCUMENTS

| 2002/0046074 | A1* | 4/2002 | Barton | G06Q 10/10 705/321 |
| 2008/0208907 | A1* | 8/2008 | Tolve | G06Q 10/06 |
| 2012/0023030 | A1* | 1/2012 | Jeffries | G06Q 10/10 705/319 |
| 2017/0262811 | A1* | 9/2017 | Ovadya | G06Q 10/1053 |
| 2017/0357943 | A1* | 12/2017 | Tiner | G06Q 10/1053 |
| 2018/0039946 | A1* | 2/2018 | Bolte | G06Q 10/1053 |
| 2018/0357608 | A1* | 12/2018 | Agrawal | G06Q 10/1053 |

OTHER PUBLICATIONS

Pinola, Melanie (Nov. 30, 2011). Resunate Is a Smart Automatic Resume Builder That Tailors Your Resume To the Job. Lifehacker, https://lifehacker.com/resunate-is-a-smart-automatic-resume-builder-that-tailo-5863724 (Year: 2011).*

* cited by examiner

*Primary Examiner* — Gabrielle A Mccormick
*Assistant Examiner* — Maame Ofori-Awuah
(74) *Attorney, Agent, or Firm* — William R Bachand (57) ABSTRACT

A proposal generator generates a proposal or request for employment with content derived from a job seeker description such as a résumé. The proposal generator relies on a natural language processor for text recognition, named entity recognition, skills identification. The proposal generator uses a trained classifier to compare skill sets of a task description to skill sets of a job seeker. A proposal is generated if a sufficient quantity of comparison scores and relevancy scores are determined for a particular pair of task description and job seeker description. The proposal has a relatively high likelihood of passing through a screener and being reviewed by a human employment decision maker.

21 Claims, 3 Drawing Sheets

SYSTEMS AND METHODS FOR GENERATING PROPOSALS

DETAILED DESCRIPTION OF THE PREFERRED EMBODIMENTS

Various systems that support employment decision making have been deployed for assisting job seekers and for assisting employers. Job seekers expect broad exposure to many opportunities because their odds of placement without excess delay are believed to be improved. Consequently, some employers receive excessive numbers of messages from job seekers. Some employers have automated screeners (e.g., Recruit, marketed by iCIMS Inc. Matawan, N.J.; Recruit, marketed by Zoho Corporation Pvt. Ltd. Pleasanton, Calif.; Talentrackr marketed by Talentrackr Pvt. Ltd. New York, N.Y.) that are expected to reduce the cost of filling positions by quickly identifying desired and/or suitable messages from job seekers. In summary, job seekers' incentives and messaging to employers continue to increase the costs and delays of employment for the job seekers and for the employers.

A method for generating a proposal, according to various aspects of the present invention, includes in any order the steps of (a) applying settings to a natural language processor to enable recognition of skill indicators; (b) for each of a plurality of job seeker descriptions, recognizing skill indicators of the job seeker description to develop a first set of skill profiles, each in accordance with one job seeker description of the plurality of job seeker descriptions; (c) for each of a plurality of task descriptions, recognizing skill indicators of the task description to develop a second set of skill profiles, each in accordance with one task description of the plurality; (d) applying settings to a classifier of the natural language processor for classification according to a job function group; (e) using the classifier to compare a member of the second set of skill profiles to each member of the first set of skill profiles to determine whether a favorable intersection exists between the member of the second set and a particular member of the first set; and (f) in accordance with a determination that a favorable intersection exits, assembling a proposal in accordance with a list of skill indicators of the second set corresponding to the member and a template sentence comprising a parameter, and specifying a value for the parameter in accordance with the job seeker description corresponding to the particular member of the first set.

A system for generating a proposal, according to various aspects of the present invention, includes a profile assembler, a comparison engine, and a proposal generator. The profile assembler cooperates with a provided natural language processor to accomplish the following steps in any order: (a) applying settings to the natural language processor to enable recognition of skill indicators; (b) for each of a plurality of job seeker descriptions, recognizing skill indicators of the job seeker description to develop a first set of skill profiles, each in accordance with one job seeker description of the plurality of job seeker descriptions; and (c) for each of a plurality of task descriptions, recognizing skill indicators of the task description to develop a second set of skill profiles, each in accordance with one task description of the plurality. The comparison engine cooperates with a provided natural language processor to accomplish the following steps in any order: (a) applying settings to a classifier of the natural language processor for classification according to a job function group; and (b) using the classifier to compare a member of the second set of skill profiles to each member of the first set of skill profiles to determine whether a favorable intersection exists between the member of the second set and a particular member of the first set. The proposal generator, in accordance with a determination that a favorable intersection exits, assembles a proposal in accordance with a list of skill indicators of the second set corresponding to the member, and a template sentence comprising a parameter having a value in accordance with the job seeker description corresponding to the particular member of the first set.

Communication as discussed above includes messages herein called messages regarding employment. A message regarding employment includes messages from employers, from job seekers, and from employment services. Job seekers, employers, and employment services are able to advertise their availability using conventional advertising media and techniques. Such an advertisement is an example of a message regarding employment. In addition, a message regarding employment (e.g., request for employment, response to advertising) may be directed to a particular job seeker, particular employer, or particular employment service. Communication with a job seeker may appear to the job seeker to include messages to/from an employer when in fact the messages are actually to/from an employment service on behalf of one or more employers. Further, employment services may communicate messages regarding employment among themselves as they attempt to serve the interests of those they serve (e.g., employers, unions, associations, governments, schools, job seekers).

Communication may involve any physical and/or electronic media. For example, a message regarding employment may be placed as conventional advertising, posted on a website expected to be reviewed by employers or employment services, given in writing (e.g., land mail, email), given aurally (e.g., telephone call, voice mail), and/or given in video (e.g., concurrent video conference, video message playback system).

According to various aspects of the present invention, the content of a message regarding employment may be designed to effectively traverse screening systems that may be used by employers and/or employment services. Content herein refers to grammatical information of a message regarding employment: visual, audible, and/or machine readable. Screening systems conventionally screen on the basis of word recognition (e.g., words used or not used in a message). Future screening systems are expected to further screen on the basis of content (e.g., capable of correctly resolving ambiguity with reference to context).

An employment service may include a placement service, a temporary labor provider, and/or an employment agency. Many educational institutions staff a placement service for their graduates. An employment service may include a representative serving as an intermediary that generates and/or screens messages regarding employment.

The term 'job seeker' is intended to be more general than the terms 'job' and 'seeker' may imply. A job seeker refers to any person or entity having one or more skills who is at least willing to perform a task for value according to those one or more skills. A job seeker, as used herein, may, without use of the present invention, be unable to effectively 'seek' employment. The present invention provides a benefit to job seekers, including obtaining an offer for employment for a person who has made no effort to seek the offer. A job seeker includes a professional employer organization that provides labor including, for example, employee management, employee benefits, payroll services, workers' compensation services, recruiting, risk management, safety services, training, and/or employee development. A job seeker whose one or more messages regarding employment have passed the employer's screening process is then considered a candidate.

An employer (e.g., a business, a non-profit organization, a government unit, a military unit, a school, a church, an association) includes any person or entity seeking skilled performance from another person or entity. An employer describes a task intended to be accomplished by a suitable job seeker and about which messages regarding employment are communicated between the employer and one or more job seekers.

Employment as used herein means any association of a candidate with an employer indicating acceptance of the job seeker by the employer for the purpose of meeting a need for skilled performance. Employment may include provision of labor for value (e.g., fixed or indefinite term; 'at will' or 'termination only for cause'; employment contract, service contract, barter, exchange; election, appointment, career, membership; specified title, office, role, project). The value exchanged may be economic value (e.g., currency, stock, legal right, privilege, credit for community service) or personal value (e.g., recognition, reputation, accreditation, honorarium). Employment includes, for example, becoming an employee, a member, an associate, a laborer, a consultant, an advisor, a contract laborer, a contributor, an associate, an adjunct, an assistant, and/or an apprentice. Association and/or membership with respect to an employer includes, for example, a faculty member, an adjunct, an of counsel, an enrolled person, a student, a registered attendee.

Educational institutions as employers employ faculty (in a conventional sense) and also employ enrolled persons under the definition of employment as used herein. For example, a university may impliedly describe a task (e.g., completing all examinations, recitations, dissertations, publications) and condition acceptance of prospective students (i.e., job seekers) to have completed high school, herein deemed an educational achievement implying proficiency in several skills for learning. The student having completed the task receives compensation (e.g., certification, degree, honorarium).

Any ability is herein called a skill whether or not the ability is refined (e.g., through development, practice, experience, special knowledge, education, talent). For example, so-called unskilled laborers have abilities herein included in the term skill. The capacity to develop an ability is also deemed a skill.

A task includes any performance involving a skill. For example, a task may take the form of an occupation, a career, a job, a position, a consulting arrangement, a project, a role, a title, an apprenticeship, a station, a team member, a responsible member, an attendee, an enlisted position, an enrolled position, and/or a contributor.

Systems and methods according to various aspects of the present invention may produce proposals. A proposal includes any message regarding employment as discussed above (e.g., a request for employment directed to an employer, a request directed to an employer for clarification of a condition for employment). For clarity of description, systems and methods for producing proposals will be described with reference to job seekers, employers, tasks, skills, and automated screening as discussed above. In other implementations, proposals may involve messages regarding, in place of employment, any one or more of the following: use of physical property for value (e.g., rental agreements), transfer of physical property for value (e.g., corporate finance, sales of products), use or sale of real property, and use or transfer of intellectual property (e.g., trademark licensing, endorsement of a product or service).

According to various aspects of the present invention, a proposal may be formed in accordance with one or more messages regarding employment from a job seeker and may be sent to one or more employers and/or employment services as discussed above. The automated function of an employer and/or employment service that receives a proposal is herein called a screener.

A system that performs one or more methods for forming a proposal according to various aspects of the present invention may involve network communication. For example, network communication system 100 of FIGS. 1-3 includes proposal generating system 102, local controller 110, network server 112, network 120, and one or more network clients 130, such as network client 132.

Figure 1:
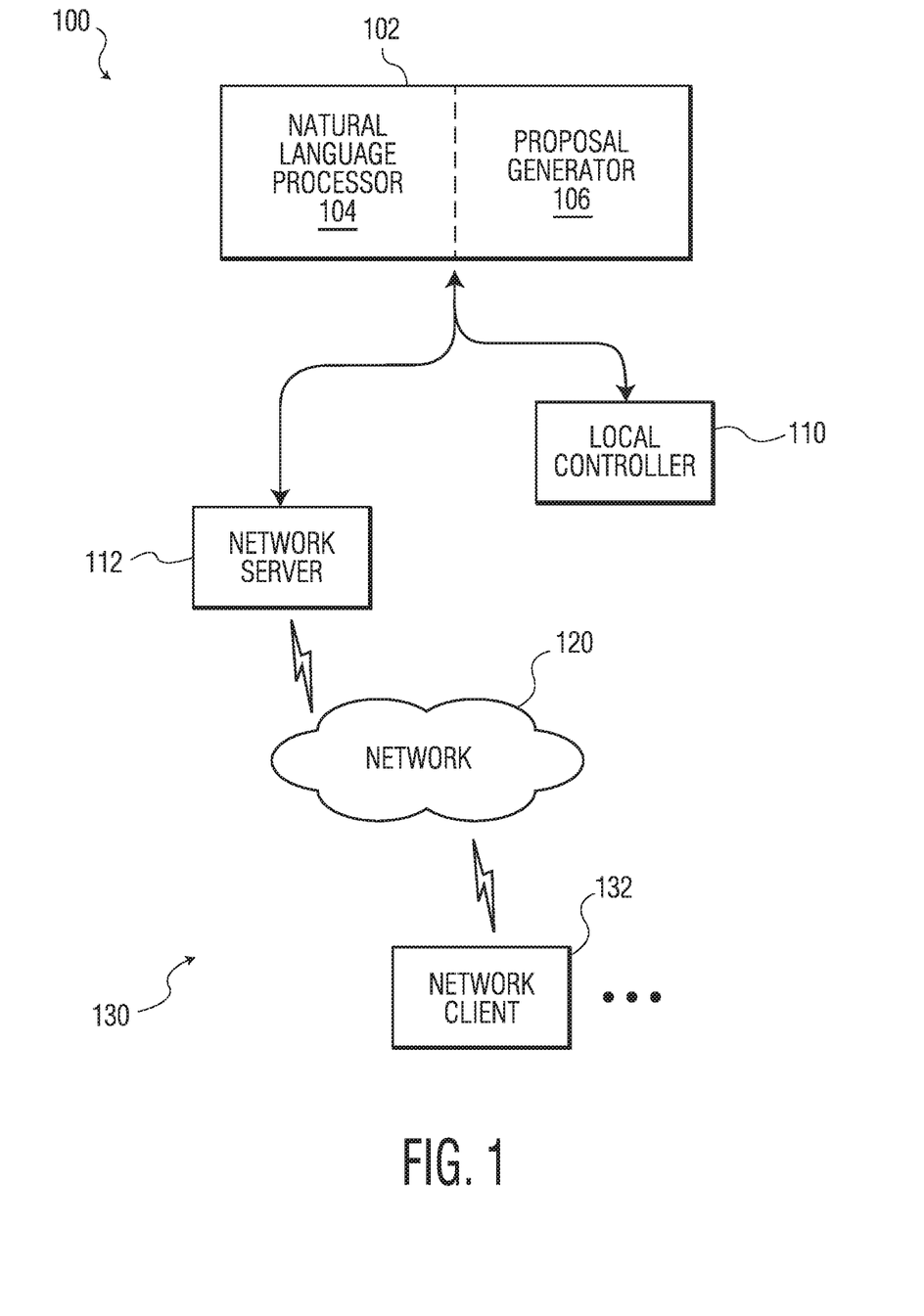
FIG. 1 is a block diagram of a system for generating proposals implemented with communication over a network.

Proposal generating system 102 includes natural language processor 104 and proposal generator 106. Proposal generating system 102 receives information provided by users of network clients 130, forms proposals in accordance with that information, and sends one or more proposals to other users of network clients 130. Users of network clients 130 may include job seekers, employers, employment services, and automated screeners, all as discussed above.

Local controller 104 is coupled for communication with proposal generating system 102. An operator of local controller 104 accomplishes system configuration and maintenance for proposal generating system 102 with conventional security advantages of local access to system 102. Some functions of local controller 104 may be performed in other implementations using a network client 132 of network clients 130. Configuration and maintenance for proposal generating system 102 may include installing and testing hardware and/or software, configuration of hardware and/or software, and training of hardware and/or software for natural language processing. In one implementation, configuration and maintenance involves the use of conventional technology by trained operators of local controller 104.

Network server 112 in cooperation with network 120 performs conventional network service functions for conveying messages between system 102 and network clients 130. Network 120 may be implemented with conventional technologies (e.g., local area network, private network, internet). For example, network server 112 may provide any combination of the conventional functions of a web page server, file server, list server, bulletin board server, video server, voice and/or video communications server, email server, and/or a short message service (SMS) server. Network server 112 may further include conventional technologies for obtaining information for proposals. Such technologies may prompt submission of information, scrape servers of information, subscribe to sources of information, and/or request information from network clients 130.

Network clients 130 include any conventional communications devices for use by persons, representatives, and/or automated communication systems. For example, network client 132 may be implemented as a personal device (e.g., cell phone, tablet, lap top computer) as used for example by a job seeker; or a server for example as used by an employer. Network client 132 may include communication software, network browser, and capture, storage, editing, input, and output capabilities for text, graphics, audio, and/or video. Network client 132 may be implemented as a substation or hub that serves client devices (not shown) for the communication needs of numerous persons, for example, employees of an employer or employment service.

A network client 132 may include one or more servers for sending, receiving, and posting of messages regarding employment, for example, descriptions supplied by those capable of offering or accepting proposals for employment. For example, a network client 132 used by an employment service may include conventional technologies for advertising and public communication regarding employment (e.g., bulletin boards, search engines, side-bar ads, electronic bill boards, marques, websites having webpages to guide submission of information, auto-responders to promote services and/or subscriptions).

A dataflow diagram illustrates relationships between sources and consumers of information, processes, and stored information. All processes may operate in series and/or concurrently, for example, when inputs sufficient for processing become available. Arrows on the diagram indicate information flow as opposed to sequence in time.

Figure 2:
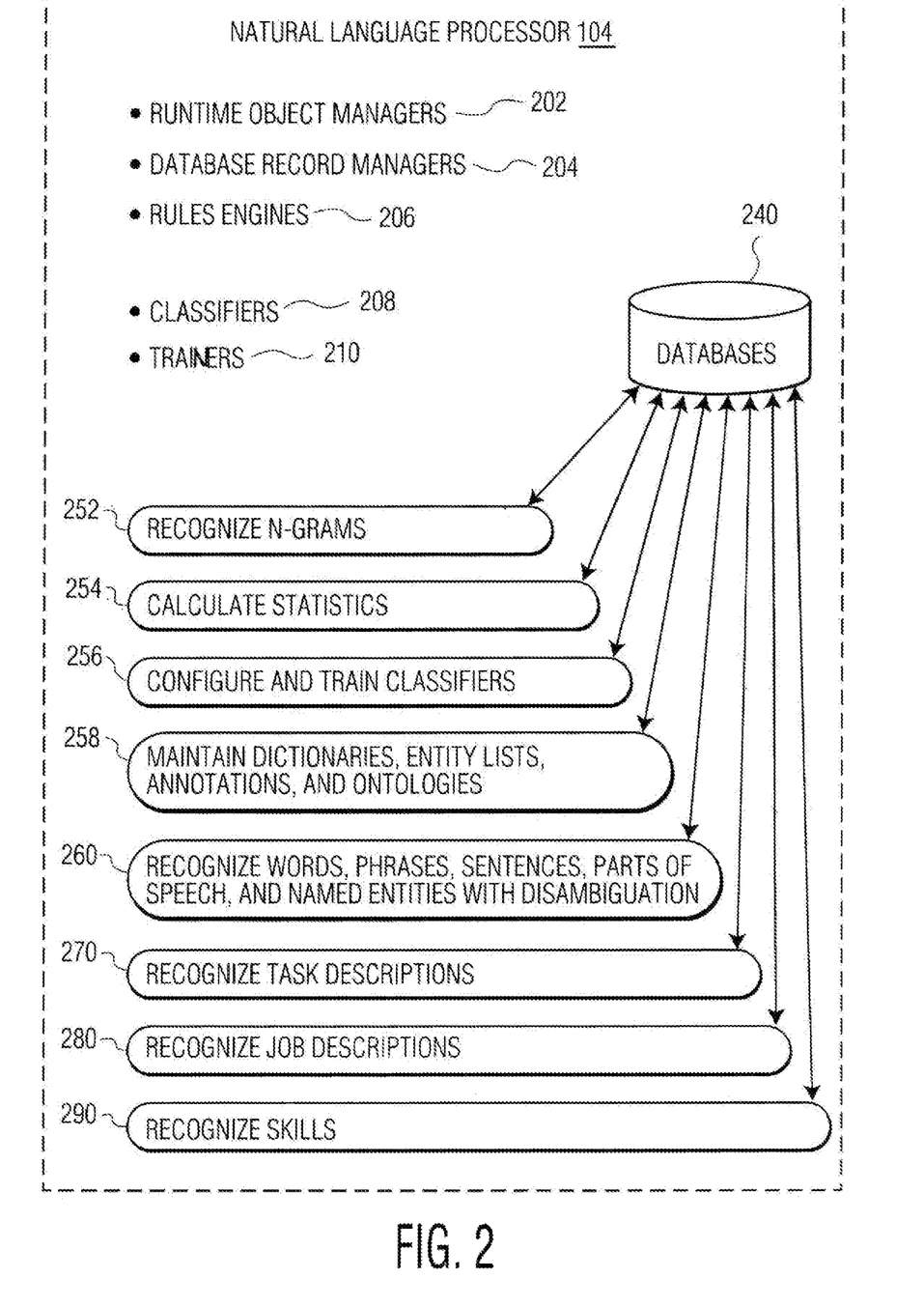
FIG. 2 is a dataflow diagram of the natural language processor of FIG. 1.

Natural language processor 104, illustrated in the dataflow diagram of FIG. 2, includes the following components: runtime object managers 202, database record managers 204, rules engines 206, classifiers 208, and trainers 210. A component may be implemented with conventional hardware and/or software, and configured as discussed herein. These components cooperate to perform the following processes with communication, for example, via records of databases 240: recognize n-grams process 252, calculate statistics process 254, configure and train classifiers process 256, maintain dictionaries, entity lists, annotations, and ontologies process 258, recognize words, sentences, parts of speech, and named entities with disambiguation process 260, recognize task descriptions process 270, recognize job seeker descriptions process 280, and recognize skills process 290. Processes 252-290 may be implemented using object oriented software (e.g., Java marketed by Oracle Corporation Redwood City, Calif.), that is performed by components 202-210 that cooperate using conventional technologies (e.g., shared resources, inter-process communication, application program interfaces (APIs), shared records and/or fields of databases 240, shared database access via SQL marketed by Oracle Corporation). In one implementation, the components and processes of natural language processor 104 are configured portions of a suite of programs known as the General Architecture for Text Engineering (GATE), a natural language toolkit developed at the University of Sheffield, South Yorkshire, England. GATE includes knowledge engineering technologies (e.g., rules engines) and machine learning technologies (e.g., classifiers). GATE was developed to recognize a wide variety of documents for information extraction.

An implementation of natural language processor 104 using GATE may omit portions of GATE and use other portions of GATE that are tuned using conventional techniques for improving efficiency with respect to recognizing task descriptions and job seeker descriptions as discussed herein (e.g., reducing resource demands, improving multi-user throughput, simplifying scalability). For example, while GATE includes classifiers of a general sort and generally applicable methods for training such classifiers, special purpose classifiers used for the present invention may be configured and trained as discussed herein with information (e.g., nodes for skill classification, training corpora, particular statistics) developed uniquely for functions of the present invention.

A runtime object manager includes hardware and software for performing (e.g., compiling, executing, interpreting) object oriented software. A runtime object manager may be implemented as a virtual machine. In one implementation, each runtime object manager 202 includes a Java™ Virtual Machine marketed by Oracle Corporation.

A database is a read/write repository for information organized as records having fields. Conventional hardware and software may be used to implement one or more databases of databases 240. Databases 240 provide a repository for software (e.g., program sources, libraries, serialized objects, classifiers, configurations, settings), text (e.g., messages regarding employment, training corpora), rules, statistics, dictionaries, entity lists, annotations, ontologies, task descriptions, and job seeker descriptions, as discussed herein. Databases 240 may be managed by database record managers 204 using objects managed by runtime object managers 202.

A database record manager includes hardware and software for storing, recalling, selecting, formatting, reporting, combining, testing, alerting, modifying, supplementing, and discarding records and/or fields of records of a conventional database. For example, database record managers 204 serve a multi-process environment of natural language processor 104. Database record managers 204 assure non-conflicting access to databases, records, and/or fields with respect to each process 252-290. Alerting may include enabling and/or activating one or more processes 252-290 when sufficient information of a database is available to process and/or when changes are made to records and/or fields on which the results of a process are dependent.

A rules engine accepts rules written, for example, in a specialized programming language (e.g., a declarative language, script, a conventional JAPE grammar of GATE) for annotating text. A rules engine accepts input text and uses conventional knowledge engineering technologies (e.g., regular expressions, conditional logic) for determining whether a pattern exists in the input text. A rules engine may include a finite state machine (a knowledge engineering technology) as opposed to a classifier (a machine learning technology). For example, processes 252, 260, 270, 280, and/or 290 may be implemented in whole or in part with calls to one or more rules engines 206. Rules engines 206 may use rules in JAPE that are part of GATE, for example, for recognizing patterns such as beginnings and endings of n-grams, proper nouns, beginnings and endings of multiple word proper nouns, dates, mailing addresses, email addresses, phone numbers, and named entities such as cities, countries, and employers.

A classifier determines whether a pattern exists in a representation of annotated text. A classifier may use conventional machine learning technologies (e.g., neural networks, Bayesian networks, implementations of influence diagrams) to assess the existence of a pattern and further provide a measure of confidence regarding existence. A classifier requires a specification of its nodes and branches (e.g., a graph, a tree, a graphical model for deep learning) and considerable training to attain a useful accuracy of its outputs. A classifier may be implemented in hardware and/or software using conventional machine learning technologies. For example, processes 256, 260, 270, 280 and/or 290 may be implemented in whole or in part with calls to one or more classifiers 208 developed from GATE with suitable node and branch specifications and training.

A trainer provides each text of a training corpus as input to a classifier, collects the outputs of the classifier, and adjusts the feature weights used by the classifier to improve its accuracy. A trainer may be implemented with conventional hardware and/or software. A feature may correspond to a node of the graph of the classifier. A feature may be a word, phrase, annotated word or phrase, and/or a reference to a node of an ontology. To determine suitable features that are significant for discrimination, a software developer configuring the classifier may use statistics determined by processes 252-254 that describe word and/or phrase frequency found in a research corpus. As used here, a corpus is a plurality of messages each in a form of text, such as a set of n-grams (e.g., 1-grams, 2-grams) or set of snippets. For example, a classifier 208 for recognizing the skill of "object oriented computer programming" may include the phrase 'object oriented', and the words 'program', 'developer', a list of languages including 'java' (a brand name for object oriented programming languages marketed by Oracle Corporation), and/or a reference to an ontology of object oriented programming languages. For example, a trainer 210 may be configured from the GATE toolkit using conventional technologies and used by process 256. Training may use a training corpus designed using conventional technologies. Adjusting the feature weights for classifying as needed for processes 260, 270, 280, and/or 290 may be accomplished, for example, using an algorithm of the type described by Shankar and Karypis in "A Feature Weight Adjustment Algorithm For Document Categorization" and all articles referred to therein, all incorporated herein by reference. A test corpus developed using conventional technologies may be used to verify that training has produced the desired accuracy.

An n-gram includes a series of characters. N-grams are not necessarily unique—snippets may refer to overlapping series of characters. Snippets are not necessarily contiguous, that is, some characters of the original text may be omitted. A rules engine may identify and or generate an n-gram from input text. An n-gram is the smallest quantity of text that can be associated with an annotation. A snippet is an n-gram with one or more annotations.

To recognize, as used herein, means to associate an annotation with an n-gram or a snippet. Formats and values for annotations may be of the type used in ANNIE, a part of GATE. Annotations may convey semantic information by referring to an instance of an ontology for the type of annotation (e.g., ontology of named entity has class for corporation), a property of the annotation (e.g., ontology of a corporation has class of possible relationships), and/or one or more values of a property (e.g., ontology of 'has a head quarters' relationship has properties for a name and a location of the head quarters). Formats and values for annotations may be of the type defined in the conventional specification of Resource Description Framework (RDF). The RDF 1.1 specification consists of a suite of W3C Recommendations and Working Group Notes, published in 2014. This suite includes an RDF Primer and a description of metadata architecture by Tim Berners-Lee, all incorporated herein by reference. Other technologies may be used, including OWL and SKOS that build on RDF and provide language for defining structured ontologies.

An annotation may include one or more constants. For example, the constant corresponding to 'noun' (e.g., an enumeration of a set of parts of speech) may indicate that the snippet has the property of that member of the set (i.e., the snippet is recognized as a noun).

An annotation may include one or more variables to be determined from other logic and/or criteria by the same or a different process 260, 270, 280, and/or 290. For example, an annotation for a snippet from a task description may specify a named entity (i.e., the type of annotation), refer to an ontology for a corporation corresponding to the named entity (i.e., a property of this type of annotation), and a location (i.e., a variable not yet determined). Process 260 may determine that such an annotation be applied. The ontology for the named entity may include several locations of business units of the corporation. If the snippet originated from a job seeker description (e.g., the job seeker stated that he or she was employed by the corporation during a range of dates), process 250 and/or process 270 may determine by using a rules engine 206 and/or a classifier 208 that the value for the location of the named entity is the location closest to a residence address of the job seeker during the duration of employment.

Recognize n-grams process 252 calls rules engines 206 for annotating n-grams of several types including quantities, units of measure, currencies, dates, date ranges, words, abbreviations, acronyms, contractions, hyphenated words, lists, educational degrees, and similar snippets suitable for accurate recognition by conventional rules, as discussed above. Recognize n-grams process may provide snippets for input to other processes (e.g., process 254, 260, 270, 280, 290). Recognize n-grams process 252 may apply one or more annotations to an n-gram. Annotations may be determined by a rules engine 206. For example, an n-gram in year-month-day format may be annotated as a date with separate values for day, month, and year. For another example, an n-gram may be recognized as a person's name based on its location at the top of a job seeker description or as an answer to a suitable question of a questionnaire. The n-gram may be annotated as a named entity, a person, and values for first name, middle initial, and last name extracted using rules for a variety of input text formats (e.g., Ms. Jane D. Smith, Jane Smith, Smith, Jane D.). Recognize n-gram process 252 may apply an annotation to an n-gram that indicates position of the n-gram within a message (e.g., number of non-white space characters from the beginning of the message to the first character of the n-gram). Recognize n-gram process 252 may read text (e.g., messages regarding employment) from databases 240 and write snippets to databases 240 for use by other processes as discussed above. Recognize n-gram process 252 in one implementation is implemented from the GATE suite of programs. In another implementation conventional programming technologies are used.

Calculate statistics process 254 evaluates quantitative measures that describe an input text. Quantitative measures may include frequency of use of a particular n-gram or snippet, determining the most used n-grams or snippets, and determining distance between particular n-grams and/or snippets. Calculate statistics process 254 may evaluate an input that includes all or part of a corpus (e.g., a research corpus) to determine quantitative measures describing the input as a whole. Calculate statistics process 254 may determine a comparison of a message (e.g., text, a set of n-grams, a set of snippets) to another message and/or to a corpus of text. A series of comparisons may be reported as an identified group of related texts of the corpus. Calculate statistics process 254 may use calculated distributions based on n-grams and/or snippets to divide a corpus into predetermined categories (e.g., task descriptions and job seeker descriptions of an economic sector or industry group, task descriptions and job seeker descriptions of a geographic group) or into categories based on the calculated distributions (e.g., groups of percentile ranges). Calculate statistics process 254 may read input text and/or snippets from databases 240 and write quantitative values to databases 240 as annotations and/or as reports (e.g., summaries of statistics, distributions of n-gram, distributions of annotation type, distributions of annotation value). Calculate statistics process 254 in one implementation is implemented from the GATE suite of programs. In another implementation conventional programming technologies are used.

Configure and train classifiers process 256 reads desired settings for each classifier 208 from databases 240 and enables that classifier to operate in accordance with the desired settings. Settings may include specification of nodes and branches for each classifier 208 as discussed above. Settings may be based on results of calculate statistics process 254 read from databases 240. Configure and train classifiers process 256 allows an operator to perform supervised machine learning using conventional technologies to train each classifier 208. Training may be accomplished by configure and train classifiers process 256 using training and testing corpora read from databases 240 and feature weight adjustment algorithms of the type discussed above in a method of the type conventionally used for configuring and training classifiers. Components of the GATE suite may be used to implement configure and train classifiers process 256. In other implementations, configure and train classifiers process 256 is implemented using conventional technologies.

Maintain dictionaries, entity lists, annotations, and ontologies process 258 enables operator input to create, modify, and remove dictionaries, entity lists, annotations, and/or ontologies from databases 240. Components of the GATE suite may be used to implement maintain dictionaries, entity lists, annotations and ontologies process 258. Components of the GATE suite may provide conventional dictionaries, entity lists, annotations, and ontologies. Conventional components may then be suitably modified (e.g., with additions, modifications, and/or deletions) for use with a particular implementation of the present invention.

A dictionary may provide an annotation for a snippet recognized as a word. An annotation may specify a root for the word, one or more possible parts of speech for the word, one or more definitions of the word, one or more variables to be defined (e.g., a transitive verb can be expected to be followed by an object; a preposition, participle, or infinitive can be expected to be followed by the remainder of a phrase). An annotation may include a variable for an expected relationship (e.g., a pronoun, a coreference). An entry in the dictionary may refer to one or more additional entries (e.g., abbreviation and acronym expansions, contraction expansions, synonyms, broader terminology). Databases 240 may include one or more dictionaries used by one or more processes 260, 270, 280, and 290.

An entity list may provide members of a common type (e.g., list of countries, list of cities of a particular country, list of first names, list of last names, list of names of corporations) for the purpose of an annotation that specifies the type (e.g., annotating the word 'London' as a city). A snippet (e.g., Oracle Corporation) already recognized as a noun may be further recognized as a named entity (e.g., corporation) when a suitable entity list (e.g., employers) includes an entry corresponding to the text of the snippet. Databases 240 may include one or more entity lists used by one or more processes 260, 270, 280, and 290.

An ontology is a graph of concepts and their relations. The graph may be a labeled directed multigraph. An instance concept may be part of one or more classes to implement levels of abstraction found in natural language. A class may have one or more parent classes to implement variety of abstractions (e.g., engineer class may have instances for each type of engineering (e.g., mechanical, electrical, etc.) and combinations (e.g., electromechanical, systems engineering)).

An ontology may express possible and/or expected relationships. An instance of a class may have one or more relationships to its parent class, each relationship specifying one or more variables for properties and/or features of the relationship. Relationships may be hierarchical. For example, a person (class) may specify an expected relationship such as 'has an employer'. For each 'has an employer' relationship, the ontology specifies a variable for a reference to the ontology of the employer. Further, for each 'has an employer' relationship, the ontology provides for one or more variables for start date and duration of employment.

An ontology may be referred to for purposes of disambiguation. For example, a portion of text may include the word 'strike'. Annotations provided by the dictionary may include ambiguity due to multiple definitions: transitive verb as the act of hitting something; and noun as a mass walkout as part of a labor dispute. Parts of speech annotations may enable disambiguation when the word 'strike' has no object in the same sentence as expected with a transitive verb. An ontology for the employer snippet of the portion of text may indicate a relationship to a labor union providing another means for disambiguation.

Ontologies, stored on databases 240 may be constructed using RDF as mentioned above. RDF is suitable for expressing an ontology because it facilitates description of a labeled directed multigraph. Other conventional ontology construction technologies may be used including RDF Schema and Web Ontology Language (OWL).

Recognize words, sentences, parts of speech, and named entities with disambiguation process 260 calls rules engines 206 and/or classifiers 208 to apply additional annotations to snippets. The rules used by rules engines 206 and the configuration and training of classifiers 208 may be as provided in the GATE suite, discussed above. Components of the GATE suite may be used to implement all of the functions of process 260. In other implementations, conventional technologies are used.

A named entity is a snippet having an annotation as a recognized person, organization, or place. Named entities are recognized as discussed above with reference to entity lists.

A message regarding employment originating from an employer (e.g., help wanted ad, posting of positions available, published invitation to attend a job fair) may include a task description. A task description may include some or all of the following that may be found in any section of a task description: an identification of an employer; a role, a title, or an office; a location; a duration; conditions for employment; preferences for employment; and a salary range. Conditions for employment may include required educational achievements and/or certifications, required experience, and/or required skills. Preferences for employment may include preferred educational achievements and/or certifications, preferred experience, and/or preferred skills. Experience may be described as a title, role, or office; a skill; how the skill was acquired (in what capacity), and a duration of use of the skill.

Messages regarding employment that originate from an employer or employment service serving an employer may be identified as task descriptions. Recognize task descriptions process 270 reads each message regarding employment from databases 240 that has been identified as a task description, calls recognize n-grams process 252, and calls recognize words, sentences, parts of speech, and named entities with disambiguation process 260 to create a first stage set of snippets in accordance with the task description. The first stage set of snippets is stored in databases 240 and input to recognize skills process 290.

A message regarding employment originating from a job seeker (e.g., cover letter with résumé, completed questionnaire) may include a job seeker description. A job seeker description may include some or all of the following in any section of the job seeker description: an identification of the job seeker, a preferred role, title, or office; a location; a duration; educational achievements and/or certifications; descriptions of experience; descriptions of accomplishments; and expected compensation. Descriptions of experience and descriptions of accomplishments may include or imply skills, how the skills were acquired (in what capacity), start dates and durations of use of each skill.

Messages regarding employment that originate from a job seeker or an employment service serving a job seeker are identified as job seeker descriptions. Recognize job seeker descriptions process 280 reads each message regarding employment from databases 240 that has been identified as a job seeker description and calls recognize n-grams process 252, calls recognize words, sentences, parts of speech, and named entities with disambiguation process 260 to create a first stage set of snippets in accordance with the job seeker description. The first stage set of snippets is stored in databases 240 for input to recognize skills process 290.

A job seeker description may have an organization of sections with section headings, such as experience, educational achievements, and accomplishments. After sections are recognized, determining whether an n-gram is a skill indicator may use different techniques for each section. For example, a rules engine 206 may apply rules and lists for educational achievements (e.g., rules for recognizing degrees, named entity recognition with a list of accredited schools). One or more skill indicators may be recognized based on recognized degrees.

A recognize skills process receives a set of snippets and determines whether a particular skill is indicated to exist, and may further determine what confidence is attributed to such existence. In one implementation, recognize task descriptions process 270 and recognize job seeker descriptions process 280 call recognize skills process 290 to analyze a respective first stage set of snippets prepared as discussed above. In another implementation, recognize skills process is alerted by a database record manager 204 that a first stage set of snippets has become available or has changed and is therefore ready for analysis.

A recognize skills process prepares inputs for one or more rules engines 206 and/or classifiers 208 to determine whether a particular skill is indicated to exist and may further determine what confidence is attributed to such existence. Prepared inputs include words and phrases recognized as skill indicators. A skill indicator may be recognized in a manner similar to recognizing a named entity as discussed above. For example, a rules engine may determine that a particular n-gram constitutes a recognized phrase; and existence of an entry in a suitable skills list corresponding to the recognized phrase may lead to recognizing the phrase as a skill indicator. Skills lists may be prepared for each economic sector and/or industry group.

To improve list search efficiency and accuracy, separate skills lists may be prepared for each job function group (e.g., a profession). A job function group may include similar roles, titles, and/or offices. For example, each of the following may be deemed a job function group: operations manager, software developer, security director. After a role, title, or office is recognized, a list search for recognizing a skill indicator may be limited to a skills list corresponding to a group for that role, title, or office.

A skill set may be formed from a skill indicator using a type of semantic enrichment. For example, recognize skills process may call a rules engine 206 to determine whether a skill indicator corresponds to an instance of a first class in a skills ontology. If so, a skill set is formed that includes the skill indicator and additional skill indicators of the skills ontology. The additional skill indicators may be of the first class and/or of a class that includes the first class according to a hierarchical relationship of the ontology. Skills ontologies may be prepared for each economic sector, industry group, and/or job function group. Use of a skills ontology for a particular economic sector, industry group, or job function group may be limited to task descriptions and job seeker descriptions having recognized indicia of the economic sector, industry group, or job function group. Skills ontologies provide a mechanism to include additional skill indicators that are implied by and/or abstractions of a particular skill indicator.

For example, 'Cobol' may be recognized as a skill indicator by membership in a skills list. A skills ontology may include a class for programming that includes an instance of a class of database programming. The database programming class may include an instance of 'Cobol'. Furthermore, a class for financial programming may include an instance of 'Cobol' since Cobol is used extensively in the financial economic sector. Consequently, a skill set may include 'Cobol', 'database programming', 'programming' (abstractions of 'Cobol'), and 'financial programming' (an implication of 'Cobol').

A skill indicator may be recognized in any section of a task description or a job seeker description. For example, in a task description a skill indicator may be included in a role, a title, an office, a condition for employment, a preference for employment, a required educational achievement and/or certification, a required experience, a required skill, a preferred educational achievement and/or certification, a preferred experience, or a preferred skill. In a job seeker description a skill indicator may be included in a preferred role, title, or office; in an educational achievement and/or certification, in a description of experience, or in a description of accomplishment.

A recognize skills process may further recognize how the skill was acquired, the starting date of use of the skill, and the duration of use of the skill. For example, recognize skills process 290 analyzes the context surrounding a skill identifier to locate one or more skill usage indicators. A word or phrase may be recognized as a skill usage indicator by a rules engine 206 in a manner analogous to recognizing a skill indicator with reference instead to a skill usage list. If the word or phrase corresponds to an entry in the skill usage list, then the word or phrase may be recognized as a skill usage indicator.

Each skill set formed by semantic enrichment may be made part of a semantic enriched set of snippets and stored on databases 240.

According to various aspects of the present invention, a recognize skills process 290 may normalize one or more skill usage indicators using one or more rules engines 206 and/or a classifiers 208 so that skill usage is recognized as one of the following: directly performed the skill, participated in a team that performed the skill, supervised another employee who performed the skill, supported a team that performed the skill.

For each recognized normalized skill usage, a recognize skills process may further determine a start date and a duration of usage. For example, recognize skills process 290 may call one or more rules engines 206 and/or classifiers 208 to determine whether context of a skill usage indicator indicates a start date and a duration of usage. For example, if a recognized skill usage indicator is part of a description of experience then the start date of employment at the related employer may be used as the start date for the skill usage. The duration of employment at the related employer may be used as the duration of the skill usage.

A proposal generator cooperates with a natural language processor to produce proposals that describe a particular job seeker in a manner that has a relatively high likelihood of being passed through an automated screener to a human authorized to make a decision regarding employment of the job seeker by a particular employer. Such a proposal describes the job seeker using terminology that meets requirements for employment and may further meet preferences for employment derived from a task description of the employer.

Figure 3:
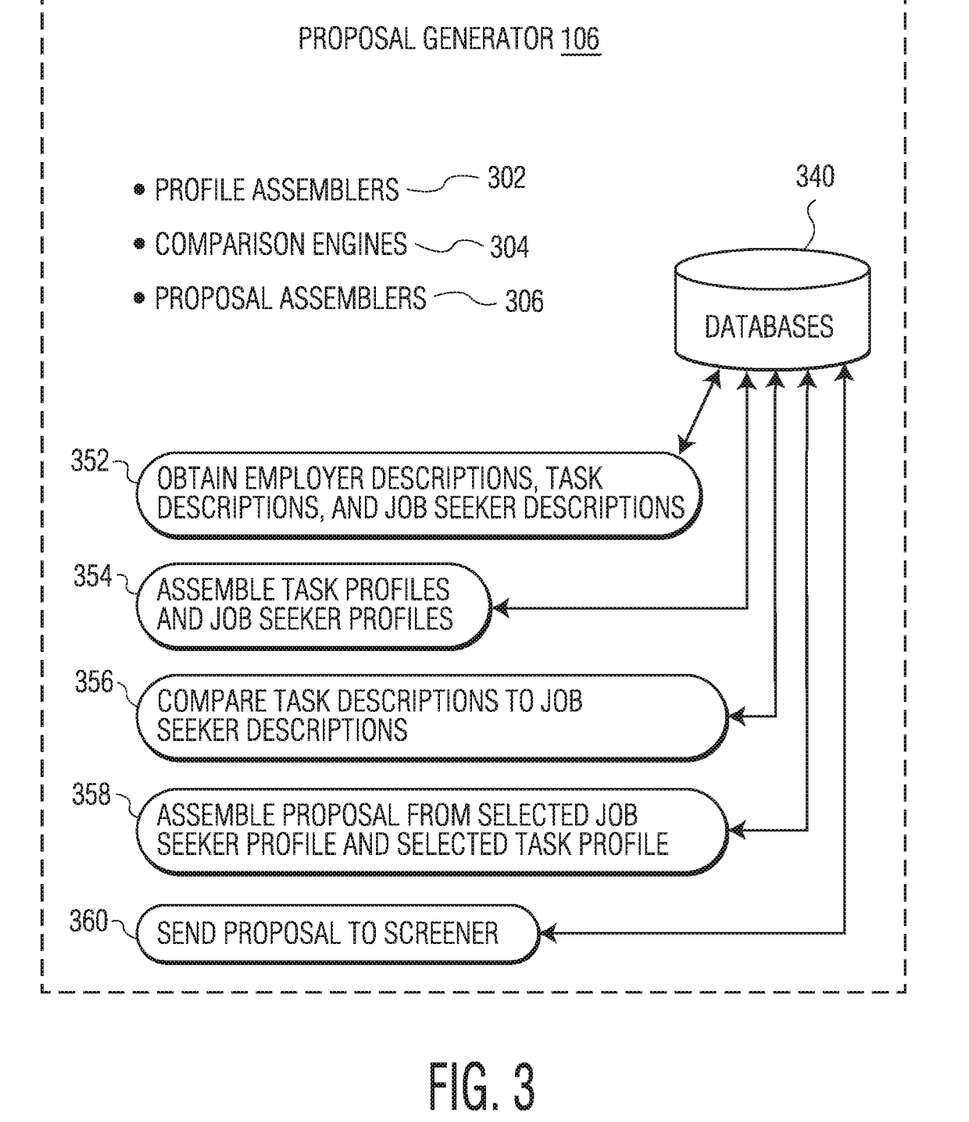
FIG. 3 is a dataflow diagram of the proposal generator of FIG. 1, according to various aspects of the present invention.

For example, proposal generator 106 illustrated in the dataflow diagram of FIG. 3 includes the following components: profile assemblers 302, comparison engines 304, and proposal assemblers 306. A component may be implemented with conventional hardware and/or software, and configured as discussed herein. These components cooperate to perform the following processes with communication, for example, via records of databases 240: obtain employer descriptions, task descriptions, and job seeker descriptions process 352, assemble task profiles, and job seeker profiles process 354, compare task descriptions to job seeker descriptions process 356, assemble proposal from selected job seeker profile and selected task profile process 358, and send proposal to screener process 360. Processes 352-360 may be implemented using object oriented software (e.g., Java marketed by Oracle Corporation), that is performed by components 302-306 that cooperate using conventional technologies (e.g., shared resources, inter-process communication, application program interfaces (APIs), shared records and/or fields of databases 240 and/or 340, shared database access via SQL marketed by Oracle Corporation). Components 302-306 may cooperate with components 202-204.

A profile describes an employer, a task, a job seeker, or a skill set. A profile may be implemented as a labeled graph. For example, a labeled graph may be developed from a semantic enriched set of snippets as produced by a natural language processor, as discussed above with reference to recognize skills process 290. The profile may be implemented using a conventional ontology language, as discussed above. The profile may be implemented using a markup language (e.g., conventional XML). The profile may be formed as one or more vectors as described for word2vec (https://en.wikipedia.org/wiki/Word2vec), and deeplearning4j (https://en.wikipedia.org/wiki/Deeplearning4j), incorporated herein by reference including the documents referred to therein.

A profile assembler creates a profile in accordance with a set of snippets. The set of snippets may be read from a database. For example, profile assemblers 302 read sets of snippets from databases 240 of FIG. 2 and store profiles in databases 340.

A profile is formatted in a manner to facilitate comparison of profiles. For example, an importance of a skill recited in a task description may be recognized in a skill profile according to the position of an underlying skill indicator in the task description. Positions closer to the beginning of the task description may be accorded higher importance. The importance of a skill recited in a job seeker description may be recognized in a skill profile according to a combination of factors including quantity of skill indicators of the same abstraction, duration of usage of the skill, normalized description of usage of the skill, and/or date of last use of the skill.

A comparison engine 304 determines whether a skill profile of a job seeker description meets a skill profile of a task description. When skill profiles include skill indicators resulting from semantic enrichment, differences in terminology used by employers and by job seekers are less likely to result in finding a mismatch between skill profiles. For example, comparison engine 304 reads a skill profile related to a job seeker description from databases 340, reads a skill profile related to a task description from databases 340, determines the extent of an intersection of the skill profiles, and stores the extent of the intersection in databases 340. To reduce demand for computing resources, the job seeker description may be selected from a group of job seeker descriptions recognized as part of an economic sector, industry group, or job function group. The task description may be selected from an analogous group of task descriptions.

A comparison engine 304 may include a trained classifier 208. Setting may be applied to a classifier 208 of natural language processor 104 for classification according to a job function group. In one implementation, a vector is compared to a document using one or more portions of the deeplearning4j tool set. The document may prepared from a task description or task profile having a dimension for every word of a vocabulary of skill indicators. The vocabulary of skill indicators may be prepared from a research corpus. The vocabulary may include indicia of frequency of occurrence of each skill indicator in the research corpus. The vector may be prepared from a skill set derived from a job seeker description. The vector represents the concept of a skill. Skill indicators of the vector may be sorted by frequency of occurrence as indicated in the vocabulary. The vector and the document are input to a classifier 208. The classifier 208 determines an extent of a match, called a comparison score. If the comparison score exceeds a limit, the job seeker description (or profile) is deemed to be relevant to the task description (or profile). The process of comparing continues with all skill sets of the job seeker description being compared in turn to the task description. The set of comparison scores provides a quantitative description of the intersection of skill sets of the vector and the document. The set of comparison scores may be used to determine whether a proposal describing the job seeker will be prepared and sent to the employer of the task description.

Each skill set formed from a job seeker description may be characterized according to four values: at which previous employer (company) was the skill used, how long was it used with that employer, when was the skill last used, and in what capacity was the skill used. These values may be determined from the job seeker description, the job seeker profile, and/or using a questionnaire answered manually by the job seeker. The value for capacity may indicate: (a) that the skill was used directly by the job seeker; (b) that the skill was used by a team that the job seeker was a member of; (c) that the skill was used by persons supervised by the job seeker; or (d) that the skill was used by a team that the job seeker supported. An example of the latter would include a job seeker's mention of the skill of computer programming where the job seeker prepared systems designs to be implemented using computer programming and the job seeker supported the computer programming team.

Whether a proposal is prepared for a given pairing of task description and job seeker description may be quantified as a relevancy score. In one implementation, a relevancy score includes three factors: relevance of work experience; relevance of skills; and relevance of educational achievements. Relevance of work experience may be determined as a sum of years of experience at various employers (from the job seeker description) divided by a condition (or preference) of employment from the task description. Relevance of skills may be determined as a quantity of skills having a suitable comparison score divided by a quantity of skills mentioned in the task description as conditions (or preferences) for employment. Relevance of educational achievements may be determined as a quantity of degrees or certifications from the job seeker description divided by a quantity of degrees or certifications from conditions (or preferences) for employment from the task description.

A proposal assembler selects a template having parameters for all or a portion of a proposal, specifies a value for each parameter in the template with information in accordance with one or more snippets, repeats the process for all templates of the proposal, and stores the completed proposal in databases 340. Parameter values may be numeric (e.g. quantity of months a skill was used), text (e.g., a skill indicator from a task description, a phrase describing how a skill was acquired), and/or lists (e.g., skill indicators with highest importance to a particular task description). Template selection may be in accordance with current or past employment, for example, with some templates using present tense and other templates using past tense.

Obtain employer descriptions, task descriptions, and job seeker descriptions process 352 may scrape, using conventional technologies, any quantity of internet resources for descriptions of employers and messages regarding employment. Such messages may include task descriptions and/or job seeker descriptions as unstructured text. Obtain employer descriptions, task descriptions, and job seeker descriptions process 352 may call a rules engine 206 to determine whether the unstructured text includes a task description, includes a job seeker description, or neither. The rules engine or a classifier 208 may call recognize n-grams process 252 and calculate statistics process 254 to determine inputs for the rules engine and/or classifier. From these inputs the rules engine and/or classifier may determine an economic sector and/or industry group to associate to the unstructured text.

In another implementation, job seeker descriptions may be obtained by engaging a job seeker using network client 132 for the completion of a questionnaire. The questionnaire may ask the job seeker to specify an economic sector and/or industry group.

Task descriptions may be obtained by engaging a representative of an employer using network client 132 for the completion of a questionnaire. The questionnaire may ask the representative to specify an economic sector and/or industry group. The questionnaire may ask the representative to provide information from which process 352 may prepare an employer profile.

Obtain employer descriptions, task descriptions, and job seeker descriptions process 352 may determine an employer profile from unstructured text by calling recognize n-grams process 252, recognize words, phrases, sentences, parts of speech, and named entities process 258 to provide a set of snippets and forming the employer profile in accordance with the set of snippets. Process 352 may further call maintain dictionaries, entity lists, annotations, and ontologies process 258 to update entity lists and/or ontologies in accordance with the employer profile.

Assemble task profiles, and job seeker profiles process 354 reads task descriptions in either unstructured text or questionnaire format from databases 340 and prepares task profiles stored on databases 340. Assemble task profiles, and job seeker profiles process 354 may call, for each type of profile, recognize n-grams process 252; recognize words, phrases, sentences, parts of speech, and named entities process 260; and recognize task descriptions process 270 or recognize job seeker descriptions process 280. The resulting semantic enriched set of snippets read from databases 240 is then used to form the corresponding profile.

Compare task descriptions to job seeker descriptions process 356 steps through every pair of job seeker profiles and task profiles that are of the same economic sector, industry group, or job function group. All skill profiles of the job seeker description and of the task description are involved in pair-wise comparisons. If a sufficient quantity of comparisons are favorable to a sufficient extent (e.g., sufficiency based on comparison scores of classifiers 208 and/or relevance scores as discussed above), then the pair is deemed suitable for the preparation of a proposal. Compare task descriptions to job seeker descriptions process 356 may be implemented with a comparison engine 304 as discussed above.

Assemble proposal from selected job seeker profile and selected task profile process 358 is implemented with a proposal assembler 306 as discussed above.

Examples of templates are described in Appendix A. A job seeker description is shown in Appendix B. Task descriptions from two different employers are shown in Appendix C and D, respectively. For the job seeker description of Appendix B and the task description of Appendix C, a first example proposal, generated according to various aspects of the present invention as discussed herein, is shown in Appendix E. For the job seeker description of Appendix B and the task description of Appendix D, a second example proposal, generated according to various aspects of the present invention as discussed herein, is shown in Appendix F. Skills derived from the job seeker description are included or omitted according to relevance to the task description as discussed above.

For each purpose of conveying information (e.g., a skill, how it was acquired, how long it was used), a set of different templates is selected. Because the proposal is intended to pass through an automated screener the sentence format of each template is relatively simple (e.g., a single sentence). Because the proposal is intended to be read by a human decision maker, a different one of a set of templates for conveying the same type of information (e.g., same capacity in which a skill was acquired) may be selected and used to provide variety and maintain interest.

Send proposal to screener process 360 for each proposal prepared by process 358, sends the proposal to a screener with reference to the associated employer profile. Sending may be implemented with network communication hardware and software discussed above with reference to network server 106, network 120, and network client 132.

A method for implementing system 100 may include (a) writing rules to recognize n-grams, proper nouns, dates, street addresses, acronyms, and other primitives where recognizing may be formulated from one or more conventional regular expressions (e.g., JAPE and ANNIE of GATE may be used); (b) calculating statistics of a research corpus such as frequency of types of n-grams, and distance between particular types of n-grams; (c) determine the scope of each classifier, for example one of: recognizing educational achievements, recognizing experience, recognizing skills, recognizing accomplishments; (d) determining the nodes, branches, and arrangement of a graph for each classifier based on the calculated statistics and a vocabulary; (e) for each classifier, prepare and use training corpora with specified outputs until acceptable accuracy is attained; (f) extending dictionaries to include industry specific jargon; (g) extending entity lists to include educational institutions, employers, locations, skill indicators, and skill usage indicators; (h) creating and/or extending ontologies for skills, educational achievements, experiences, and accomplishments; (i) extending annotation formats to include relationships with references to ontologies; and (j) preparing and using test corpora of job seeker descriptions and task descriptions to assess accuracy of recognizing.

The foregoing description discusses preferred embodiments of the present invention, which may be changed or modified without departing from the scope of the present invention as defined in the claims. The invention includes any practical combination of the structures and methods disclosed. The examples listed in parentheses may be alternative or combined in any manner. The term 'or' as used in the specification and claims means the open-ended inclusive-or not the exclusive-or and not a closed-ended expression. As used in the specification and claims, the words 'of', 'having', and 'including' in all grammatical variants are open-ended and synonymous with 'comprising' and its grammatical variants. While for the sake of clarity of description several specific embodiments of the invention have been described, the scope of the invention is intended to be measured by the claims as set forth below.

What is claimed is:

1. A method, performed by a computer system, for generating a proposal, the method comprising:

accessing from a database a plurality of job seeker descriptions and a plurality of task descriptions;

for each of the plurality of job seeker descriptions, recognizing, by a natural language processor of the computer system, skill indicators of the job seeker description to assemble a respective first set of skill profiles, each skill profile of each respective first set in accordance with one job seeker description of the plurality of job seeker descriptions;

for each of the plurality of task descriptions, recognizing, by the natural language processor, skill indicators of the task description to assemble a respective second set of skill profiles, each skill profile of each respective second set in accordance with one task description of the plurality of task descriptions;

associating indicia of a suitable respective job function group of a multiplicity of job function groups to each skill profile of each job seeker description of the plurality of job seeker descriptions;

associating indicia of a suitable respective job function group of the multiplicity of job function groups to each skill profile of each task description of the plurality of task descriptions;

identifying a first collection of job seeker descriptions, each job seeker description of the first collection having an association with a particular job function group;

identifying a second collection of task descriptions, each task description of the second collection having an association with the particular job function group;

accessing a classifier, of the computer system, trained in accordance with the particular job function group and essentially limited to recognizing skill profiles of the particular job function group;

comparing, using the classifier with a population consisting essentially of the first collection and the second collection, skill profiles of the first collection to skill profiles of the second collection to select a job seeker description of the first collection and to select a task description of the second collection;

in accordance with identifying a job seeker of the selected job seeker description and an employer of the selected task description, generating, by the computer system and without human intervention, the proposal wherein
(a) the proposal comprises an identifier of the job seeker and a complete sentence; and
(b) generating comprises
(1) selecting a template from a plurality of templates, the template comprising a parameter; and
(2) replacing the parameter with a replacement skill indicator to form the complete sentence, the replacement skill indicator as used in the selected task description; and initiating, by the computer system, submission of the proposal for consideration by the employer, initiating comprising at least one of printing and network communication.

2. The method of claim 1 wherein:

a skill profile associated with at least one of a job seeker description of the plurality of job seeker descriptions and a task description of the plurality of task descriptions comprises an annotation comprising a variable; and generating further comprises determining the variable in accordance with an expected relationship.

3. The method of claim 1 wherein assembling a skill profile associated with a job seeker description of the plurality of job seeker descriptions further comprises determining at least one of indicia of a capacity of skill usage and indicia of a duration of skill usage.

4. The method of claim 1 wherein:

comparing further comprises determining a respective relevance of each skill profile of the selected job seeker description; and generating further comprises selecting the template in accordance with the respective relevance; thereby omitting templates of insufficient relevance.

5. The method of claim 1 wherein:

the proposal further comprises respective content regarding each former employer of the job seeker, each respective content comprises a respective work experience template for describing a respective skill; and generating further comprises selecting each respective template from a group of dissimilar work experience templates, each work experience template of the group being suitable for describing the respective skill; thereby enabling keeping the interest of a human decision maker reading the proposal.

6. The method of claim 1 wherein:
the proposal further comprises a first content about a former employer of the job seeker and a second content about a current employer of the job seeker; and
generating further comprises selecting a past tense template to include in the first content and a present tense template to include in the second content.

7. The method of claim 1 wherein recognizing skill indicators comprises:
recognizing particular phrases, from at least one of a job seeker description of the plurality of job seeker descriptions and a task description of the plurality of task descriptions, as potentially indicating a skill;
selecting a skills list from a plurality of skills lists in accordance with the suitable respective job function group; and
for each particular phrase, recognizing a skill indicator includes searching the skills list for a member of the skills list that matches the particular phrase.

8. A computer system for generating a proposal, the computer system comprising:
a. a profile assembler that cooperates with a provided natural language processor to accomplish
(1) accessing from a database a plurality of job seeker descriptions and a plurality of task descriptions;
(2) for each of the plurality of job seeker descriptions, recognizing skill indicators of the job seeker description to assemble a respective first set of skill profiles, each skill profile of each respective first set in accordance with one job seeker description of the plurality of job seeker descriptions;
(3) for each of the plurality of task descriptions, recognizing skill indicators of the task description to assemble a respective second set of skill profiles, each skill profile of each respective second set in accordance with one task description of the plurality of task descriptions;
(4) associating indicia of a suitable respective job function group of a multiplicity of job function groups to each skill profile of each job seeker description of the plurality of job seeker descriptions;
(5) associating indicia of a suitable respective job function group of the multiplicity of job function groups to each skill profile of each task description of the plurality of task descriptions;
(6) identifying a first collection of job seeker descriptions, each job seeker description of the first collection having an association with a particular job junction group;
(7) identifying a second collection of task descriptions, each task description of the second collection having an association with the particular job function group;
b. a comparison engine that accesses a classifier, trained in accordance with the particular job function group and essentially limited to recognizing skill profiles of the particular job function group, to accomplish comparing by the classifier, with a population consisting essentially of the first collection and the second collection, skill profiles of the first collection to skill profiles of the second collection to select a job seeker description of the first collection and to select a task description of the second collection; and
c. a proposal generator that, in accordance with identifying a job seeker of the selected job seeker description and an employer of the selected task description, generates, without human intervention, the proposal wherein
(1) the proposal comprises an identifier of the job seeker and a complete sentence; and
(2) generating comprises
(a) selecting a template from a plurality of templates, the template comprising a parameter; and
(b) replacing the parameter with a replacement skill indicator to form the complete sentence, the replacement skill indicator as used in the selected task description.

9. The computer system of claim 8 wherein:
a. a skill profile associated with at least one of a job seeker description of the plurality of job seeker descriptions and a task description of the plurality of task descriptions comprises an annotation comprising a variable; and
b. the profile assembler determines the variable in accordance with an expected relationship.

10. The computer system of claim 8 wherein the profile assembler assembles a skill profile associated with a job seeker description of the plurality of job seeker descriptions to comprise at least one of indicia of a capacity of skill usage and indicia of a duration of skill usage.

11. The computer system of claim 8 wherein:
a. the proposal generator determines a respective relevance of each skill profile of the selected job seeker description; and
b. the proposal generator selects the template in accordance with the respective relevance; thereby omitting templates of insufficient relevance.

12. The computer system of claim 8 wherein:
a. the proposal further comprises respective content regarding each former employer of the job seeker, each respective content comprises a respective work experience template for describing a respective skill; and
b. the proposal generator selects each respective work experience template from a group of dissimilar work experience templates, each work experience template of the group being suitable for describing the respective skill; thereby enabling keeping the interest of a human decision maker reading the proposal.

13. The computer system of claim 8 wherein:
a. the proposal further comprises a first content about a former employer of the job seeker and a second content about a current employer of the job seeker; and
b. the proposal generator selects a past tense template to include in the first content and a present tense template to include in the second content.

14. The computer system of claim 8 wherein recognizing skill indicators comprises:
a. recognizing particular phrases, from at least one of a job seeker description of the plurality of job seeker descriptions and a task description of the plurality of task descriptions, as potentially indicating a skill;
b. selecting a skills list from a plurality of skills lists in accordance with the suitable respective job function group; and
c. for each particular phrase, recognizing a skill indicator includes searching the skills list for a member of the skills list that matches the particular phrase.

15. A non-transitory computer-readable medium comprising indicia of instructions for execution by a computer system, the indicia comprising:

a. indicia of instructions to cause the computer system to access from a database a plurality of job seeker descriptions and a plurality of task descriptions;
b. indicia of instructions to cause the computer system to recognize by use of a natural language processor of the computer system and for each of the plurality of job seeker descriptions, skill indicators of the job seeker description to assemble a respective first set of skill profiles, each skill profile of each respective first set in accordance with one job seeker description of the plurality of job seeker descriptions;
c. indicia of instructions to cause the computer system to recognize by use of the natural language processor and for each of the plurality of task descriptions, skill indicators of the task description to assemble a respective second set of skill profiles, each skill profile of each respective second set in accordance with one task description of the plurality of task descriptions;
d. indicia of instructions to cause the computer system to associate indicia of a suitable respective job function group of a multiplicity of job function groups to each skill profile of each job seeker description of the plurality of job seeker descriptions;
e. indicia of instructions to cause the computer system to associate indicia of a suitable respective job function group of the multiplicity of job function groups to each skill profile of each task description of the plurality of task descriptions;
f. indicia of instructions to cause the computer system to identify a first collection of job seeker descriptions, each job seeker description of the first collection having an association with a particular job junction group;
g. indicia of instructions to cause the computer system to identify a second collection of task descriptions, each task description of the second collection having an association with the particular job junction group;
h. indicia of instructions to cause the computer system to access a classifier, of the computer system, trained trained in accordance with the particular job function group and essentially limited to recognizing skill profiles of the particular job function group;
i. indicia of instructions to cause the computer system to compare, using the classifier with a population consisting essentially of the first collection and the second collection, skill profiles of the first collection to skill profiles of the second collection to select a job seeker description of the first collection and to select a task description of the second collection; and
j. indicia of instructions to cause the computer system, in accordance with identifying a job seeker of the selected job seeker description and an employer of the selected task description, to generate without human intervention the proposal wherein
  (1) the proposal comprises an identifier of the job seeker and a complete sentence; and
  (2) generating comprises
    (*a*) selecting a template from a plurality of templates, the template comprising a parameter; and
    (b) replacing the parameter with a replacement skill indicator to form the complete sentence, the replacement skill indicator as used in the selected task description.

16. The non-transitory computer-readable medium of claim 15 wherein:
a. a skill profile associated with at least one of a job seeker description of the plurality of job seeker descriptions and a task description of the plurality of task descriptions comprises an annotation comprising a variable; and
b. the indicia of instructions to cause the computer system to generate further comprises indicia of instructions to cause the computer system to determine the variable in accordance with an expected relationship.

17. The non-transitory computer-readable medium of claim 15 wherein indicia of instructions to cause the computer system to assemble a skill profile associated with a job seeker description of the plurality of job seeker descriptions further comprises indicia of instructions to cause the computer system to determine at least one of indicia of a capacity of skill usage and indicia of a duration of skill usage.

18. The non-transitory computer-readable medium of claim 15 wherein:
a. indicia of instructions to cause the computer system to compare further comprises indicia of instructions to cause the computer system to determine a respective relevance of each skill profile of the selected job seeker description; and
b. indicia of instructions to cause the computer system to generate further comprises indicia of instructions to cause the computer system to select the template in accordance with the respective relevance; thereby omitting templates of insufficient relevance.

19. The non-transitory computer-readable medium of claim 15 wherein:
a. the proposal further comprises respective content regarding each former employer of the job seeker, each respective content comprises a respective work experience template for describing a respective skill; and
b. the indicia of instructions to cause the computer system to generate further comprises indicia of instructions to cause the computer system to select each respective work experience template from a group of dissimilar work experience templates, each work experience template of the group being suitable for describing the respective skill; thereby enabling keeping the interest of a human decision maker reading the proposal.

20. The non-transitory computer-readable medium of claim 15 wherein:
a. the proposal comprises a first content about a former employer of the job seeker and a second content about a current employer of the job seeker; and
b. the indicia of instructions to cause the computer system to generate further comprises indicia of instructions to cause the computer system to select a past tense template to include in the first content and a present tense template to include in the second content.

21. The non-transitory computer readable medium of claim 15 wherein indicia of instructions to cause the computer system to recognize skill indicators comprises:
a. indicia of instructions to cause the computer system to recognize particular phrases, from at least one of a job seeker description of the plurality of job seeker descriptions and a task description of the plurality of task descriptions, as potentially indicating a skill;
b. indicia of instructions to cause the computer system to select a skills list from a plurality of skills lists in accordance with the suitable respective job function group; and
c. indicia of instructions to cause the computer system to, for each particular phrase, recognize a skill indicator includes searching the skills list for a member of the skills list that matches the particular phrase.

\* \* \* \* \*